United States Patent [19]

Tapphorn

[11] Patent Number: 5,337,834
[45] Date of Patent: Aug. 16, 1994

[54] DISK EXCAVATING AND GRADING ATTACHMENT

[76] Inventor: David E. Tapphorn, 270 S. Franklin, Colby, Kans. 67701

[21] Appl. No.: 914,460

[22] Filed: Jul. 17, 1992

[51] Int. Cl.[5] .................. A01B 59/048; A01B 7/00
[52] U.S. Cl. ........................... 172/810; 37/409; 172/569; 172/220; 172/308; 172/600; 172/647
[58] Field of Search ............... 172/810, 221, 222, 297, 172/527, 308, 228, 229, 204, 220, 224, 393, 394, 569, 574, 576, 599, 600, 647, 615, 701, 273, 834; 37/270, 271, 273, 390, 409

[56] References Cited

U.S. PATENT DOCUMENTS

| | | | |
|---|---|---|---|
| 802,068 | 10/1905 | Case | 172/569 |
| 876,145 | 1/1908 | Buchet et al. | 172/569 |
| 1,731,925 | 10/1929 | Hester | 172/308 |
| 1,888,128 | 11/1932 | Hester | 37/390 |
| 2,711,597 | 6/1955 | Werner et al. | 37/270 |
| 2,754,741 | 7/1956 | Hollis | 172/308 |
| 3,224,392 | 12/1965 | Mellen | 172/810 |
| 4,304,305 | 12/1981 | Bartel | 172/821 |
| 4,484,636 | 11/1984 | Hodgson, Jr. | 172/701 |
| 4,554,978 | 11/1985 | Schneider | 172/817 |
| 4,597,452 | 7/1986 | Tapphorn et al. | 172/799.5 |

*Primary Examiner*—Randolph A. Reese
*Assistant Examiner*—Spencer Warnick

[57] ABSTRACT

An earth moving machine attachment is disclosed comprising a plurality of disk units mounted to a disk unit mounting beam which is fixed to a beam pushing frame for pivotally coupling to a dozer or tractor C frame. The beam pushing frame is angled obtusely in a clockwise or counterclockwise direction from the direction of push by a pair of reciprocal operating hydraulic cylinders to grade the earth materials to one side or the other of the C frame. The disk unit mounting beam and attached disk units are hingedly connected to a parallel offset shaft of the beam pushing frame for tilting the disk blades to provide restricted floatation on the earth materials. A sliding feature of the hinged connection between the disk unit mounting beam and the beam pushing frame accommodates hydraulic power means of shifting the load relative to the pushing axis of the earth moving machine. In operation, each disk blade of the attachment excavates a ribbon of earth materials and discharges these materials laterally with a high momentum as determine by the speed of the earth moving machine. The angled arrangement of the sequential disk units grades the earth materials to one side or the other of the C frame depending on the set angle of the beam pushing frame. A hydraulic power means of setting the pitch angle of the disk blades for optimum excavation and grading is provided by an articulated embodiment of the plurality of disk units mounted as a gang relative to the disk unit mounting beam. The device is designed as an efficient blade attachment for rough excavating and grading of earth materials including snow using earth moving machines.

10 Claims, 3 Drawing Sheets

DISK EXCAVATING AND GRADING ATTACHMENT

BACKGROUND OF THE INVENTION

1. The Prior Art

Dozers, road graders, and agricultural tractors have conventionally used rectangular shaped blades for excavating, pushing and grading earth materials including snow. Many of these blades have been disclosed in patents, and the following are exemplary of the types of patents issued in this class; U.S. Pat. No. 4,464,852 to Rice, U.S. Pat. No. 4,445,577 to Russell D.E. and Russell T.H., U.S. Pat. No. 4,306,625 to Davis, U.S. Pat. No. 4,554,978 to Schneider, U.S. Pat. No. 4,135,583 to Becker, and U.S. Pat. No. 3,853,181 to Yoshizaki.

Multi-blades and articulated blades such as those disclosed by U.S. Pat. No. 4,834,191 to Vecchio, U.S. Pat. No. 4,758,116 to Ezoe, U.S. Pat. No. 4,384,620 to Uchida et al., U.S. Pat. No. 4,270,617 to Cantarella and Cecchi, U.S. Pat. No. 4,099,578 to Stevens, U.S. Pat. No. 4,029,157 to Freese, and U.S. Pat. No. 4,019,587 to Meisel, have also been invented to aid in the excavation, pushing, and grading process for various earth materials. All of the prior art blade inventions, including the multi-blade and articulated blades, use contiguous blade or contiguous multi-blade designs with large surface areas in continuous contact with the excavated materials. Although the contiguous blade design ensures that the earth materials are smoothly graded along the surface of the earth, a contiguous blade is not necessary for performing rough excavating and grading of earth materials. Many applications such as initial road bed construction, terrace construction on farmland, waterway construction, ditching, diking and open pit mining do not require a smooth finish to the earth materials after each pass of the earth moving machine. For these types of rough excavating and grading applications, the efficiency of the earth moving machine is improved by using discrete disk blades for excavating ribbons of earth materials and discharging these materials laterally with high momentum. Frictional forces associated with shifting earth materials along a contiguous blade are significantly reduced with discrete disk blades, particularly if the earth moving machine has sufficient horsepower to maintain a speed of at least five miles per hour. Only the last disk blade of a plurality of disk grading units is constrained to grading materials in a manner analogous to conventional earth moving blades.

My invention describes a rough excavating and grading attachment using discrete disk blades laterally spaced along a beam which can be attached to conventional dozer C frames such as disclosed in U.S. Pat. No. 4,167,979 to Freese and Wheeler, attached to frame assemblies for power machines such as disclosed in U.S. Pat. No. 4,306,625 to Davis, attached to agricultural dozer frames such as disclosed in U.S. Pat. No. 4,304,305 to Bartel or attached to other types of tractive pushing frames. The U.S. Pat. No. 4,597,452 issued to Tapphorn R.M. and Tapphorn D.E., is exemplary of the class of discrete disk blade graders, however, the disk grading terrace plow cited in the referenced invention is restricted to towing in its application and claims.

BRIEF SUMMARY OF THE INVENTION

The invention provides a new excavating and grading attachment for earth moving machines and tractors, and comprises a plurality of disk units laterally spaced along a disk unit mounting beam. The disk unit mounting beam is hingedly connected to a beam pushing frame to allow tilting of the disk unit mounting beam and disk units, and to provide for floatation of disk blades in the earth materials including snow. The beam pushing frame is pivotally mounted to a bulldozer or tractor C frame for angling the beam pushing frame with attached disk unit mounting beam and disk blade units. The depth of cut is controlled by adjustable skid pads attached to each side of the disk unit mounting beam.

Each concave disk blade of the plurality of disk units is mounted to a disk socket plate with plow bolts for ease of removal. The disk socket plate is attached to the outer sleeve of a longitudinal extension assembly in which an inner piston is connected to the disk unit mounting beam. This feature of the longitudinal extension assembly, when controlled by hydraulic power means, provides the capability of remotely extending or retracting each disk blade unit relative to adjacent units.

Adjustment of the grading angle for the plurality of disk units is controlled via a pair of reciprocal operating hydraulic cylinders mounted one to each side of the C frame and coupled to the beam pushing frame. An articulated embodiment of the plurality of disk units operated as a gang relative to the disk unit mounting beam is also disclosed with this invention as a means of setting the pitch angle of the disk blades for optimum excavation and grading of the earth materials.

A hydraulic cylinder is provided for laterally shifting the disk unit mounting beam relative to the beam pushing frame by translating a sliding tube attached to the disk unit mounting beam along the parallel offset shaft of the beam pushing frame. This feature allows the load of the disk excavating and grading attachment to be centered along the push axis of the dozer or tractor.

BRIEF DESCRIPTION OF THE DRAWINGS

A detailed description of the invention is given below with reference to the accompanying drawings for a representative embodiment, in which.

DETAILED DESCRIPTION

Figure 1:
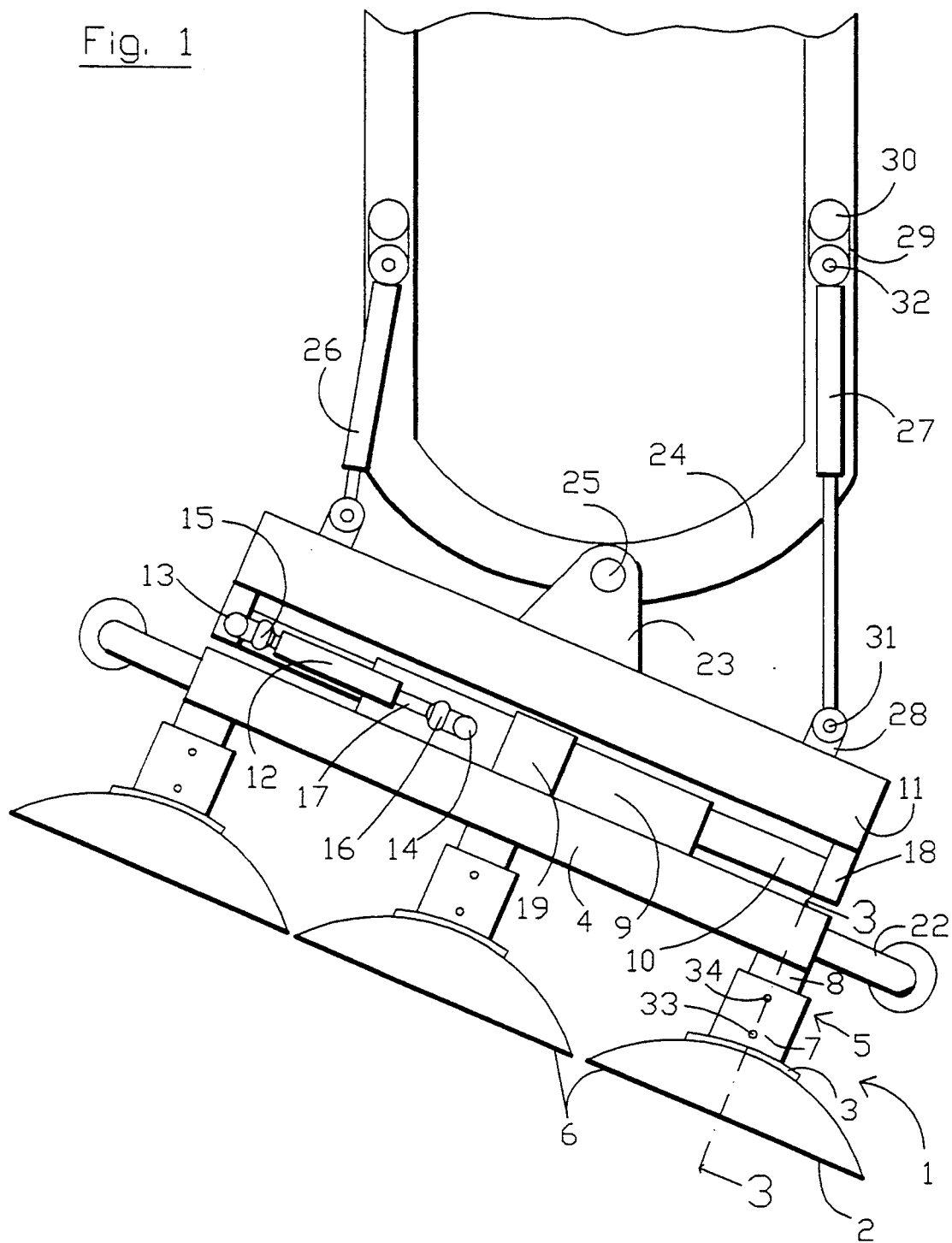
FIG. 1 is a top plain view of the disk excavating and grading attachment showing a three disk unit embodiment coupled to the C frame of a dozer or tractor with the plurality of disk units angled obtusely in a clockwise direction from the push direction for grading.
Figure 2:
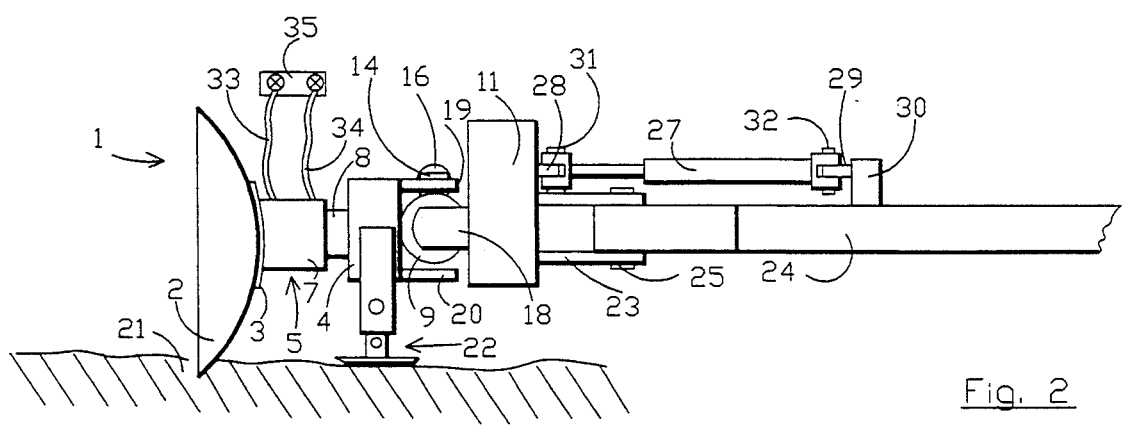
FIG. 2 is a side elevation view of the disk excavating and grading attachment with the plurality of disk units aligned with to the direction of push.

In an illustrative embodiment of the invention, FIG. 1 and FIG. 2, each disk unit 1 comprising the concave disk blade 2, the disk socket plate 3 is mounted to a disk unit mounting beam 4 via a longitudinal extension assembly 5.

This embodiment shows three disk units 1 spaced laterally along the disk unit mounting beam 4 at equal intervals. Other embodiments are also inferred by the invention having a plurality of disk units 1 spaced along the disk unit mounting beam 4. The lateral spacing of the plurality of disk units 1 is determined by allowing for independent telescoping extension or retraction of the longitudinal extension assembly 5 with adequate clearance between the edges of the adjacent concave disk blades 6. The concave disk blades 2 are removably mounted to the disk socket plate 3 with plow bolts, and the disk socket plate 3 is mounted to the outer sleeve 7 of the longitudinal extension assembly 5 comprising the outer sleeve 7 and the piston 8 in which said piston 8 is attached to the disk unit mounting beam 4.

The disk unit mounting beam 4 is mounted to a sliding tube 9 which is slidingly engaged over a parallel offset shaft 10. This feature allows the disk unit mounting beam 4 with the plurality of disk units 1 to float on the earth materials during excavation and grading by allowing the sliding tube to rotate around the offset shaft. In addition, the hinge connection of sliding tube 9 is designed to slide laterally along the parallel offset shaft 10 for positioning the disk unit mounting beam 4 with a plurality of disk units 1 relative to the beam pushing frame 11. This feature of the invention provides the means for mechanically shifting the load of the disk excavating and grading attachment in line with the push axis of the dozer or tractor C frame 24.

The hydraulic cylinder 12 connected between a first mounting post 13 and a second mounting post 14, via a pair of ball and socket joints 15 and 16, respectively, provide the means for remotely shifting the sliding tube 9 along parallel offset shaft 10 by extending or retracting piston rod 17. The parallel offset shaft 10 is mounted to a pair of support flanges 18 attached to the beam pushing frame 11.

Upper and lower flange bracket 19 and 20, respectively, attached to disk unit mounting beam 4, limit the rotation of sliding tube 9 hingedly connected to the parallel offset shaft 10. Upper and lower flange brackets 19 and 20, respectively, limit the rotation of the tube 9 around the offset shaft 10. Depth of cut 21 and floatation stability is controlled via a pair of skid pad assemblies 22 (similar to skid pad assemblies disclosed by U.S. Pat. No. 2,711,597 to Werner and Wagner) attached on opposite ends of the disk unit mounting beam 4.

The beam pushing frame 11 is attached to a clevis assembly 23 which is pivotally attached to the C frame 24 via coupling pin 25. The angle of the beam pushing frame 11 relative to the direction of push is adjusted clockwise or counterclockwise through an obtuse angle measured from the direction of push by reciprocally operating a pair of hydraulic cylinders 26 and 27 mounted one on each side of the dozer or tractor C frame 24. Hydraulic cylinders 26 and 27 are each mounted in a mirror configuration between a first ear flange 28 of the beam pushing frame 11 and a second ear flange 29 of upright mounting post 30 using coupling pins 31 and 32.

Figure 3:
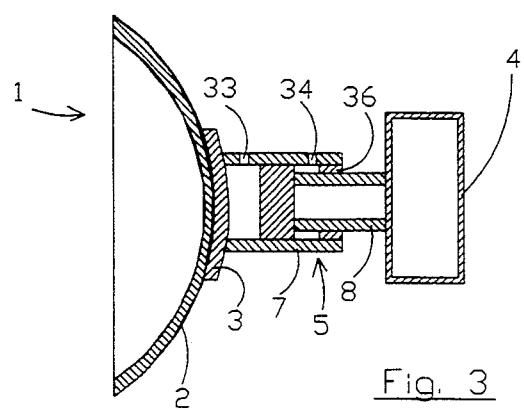
FIG. 3 is a sectional side view of a single disk unit showing the hydraulic means for telescoping the outer sleeve of the longitudinal extension assembly relative to the fixed piston.

Referring to FIG. 2 and 3, the adjustment of the longitudinal extension assembly 5 of each disk unit 1 is controlled by hydraulically sliding the outer sleeve 7 over piston 8. Fluid tubes 33 and 34 connect the hydraulic cavities of the piston 8 and sleeve 7 to an independent control valve 35 of the tractor or dozer hydraulic system for each of the disk units 1. Extension of the longitudinal extension assembly 5 is restricted by a cylindrical stop 36 as shown in FIG. 3.

Figure 4:
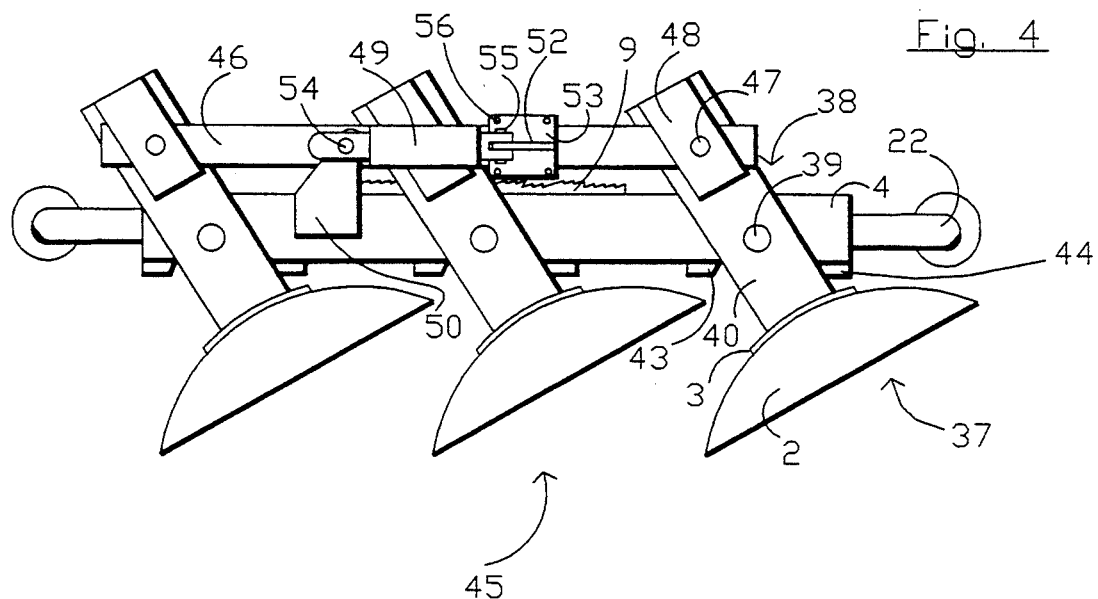
FIG. 4 is a top plain view of an articulated embodiment for mounting the plurality of disk units to the disk unit mounting beam as a gang shown with a counter-clockwise rotation of the gang of disk units.
Figure 5:
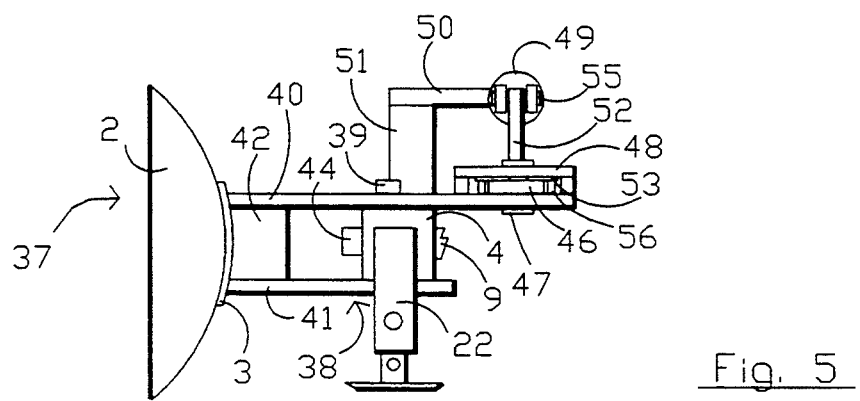
FIG. 5 is a side elevation view of the articulated embodiment for mounting the plurality of disk units as a gang to the disk unit mounting beam shown with the axis of the disk units aligned perpendicular to the disk unit mounting beam.

An articulated embodiment for mounting the plurality of disk units 1 to the disk unit mounting beam 4 as a gang is shown in FIG. 4 and FIG. 5. In this embodiment, each disk unit 37 comprises a concave disk blade 2 and the disk socket plate 3 mounted to a clevis beam 38 which is pivotally mounted to the disk unit mounting beam 4 via a coupling pin 39 inserted through an upper flange plate 40 and a lower flange plate 41 of the clevis beam 38. A pair of gusset plates 42 are mounted between the upper flange plate 40 and the lower flange plate 41 forming a box-beam attachment of the clevis beam 38 to the disk socket plate 3, and provides a means for limiting the rotation of each disk unit against a respective pair of adjustable stops 43 and 44. The plurality of disk units 37, are rotated clockwise or counterclockwise from the direction of push as a gang of disk units 45 by transversely shifting the sliding bar 46 which is pivotally mounted to the upper flange plate 40 of each disk unit 37 via coupling pin 47 inserted through the box beam structure 48 attached to the upper flange plate 40. The sliding bar 46 is transversely shifted relative to the disk unit mounting beam 4 by hydraulic cylinder 49 mounted to the first ear flange 50 of mounting post 51 and the second ear flange 52 of clamp 53 via coupling pins 54 and 55, respectively. The clamp 53 is adjustably connected to the sliding bar 46 via the clamping bolts 56 (one of four). The articulated embodiment for mounting the gang of disk units 45 to the disk unit mounting beam 4 provides the means for adjusting the pitch angle of each disk unit 37 to obtain optimum excavation and pitch of the earth materials. The counterclockwise rotation depicted in FIG. 4 for the gang of disk units 45 is used with a clockwise setting of the beam pushing frame 11 as previously described (referring specifically to FIGS. 1 and 2), and vise versa for a counterclockwise setting of the beam pushing frame 11.

In its application, the disk excavating and grading attachment is coupled to the C frame 24 of a dozer or tractor, and the beam pushing frame 11 is angled obtusely in a clockwise direction to the direction of push while the gang of disk units 45 is rotated counterclockwise by fully retracting hydraulic cylinder 49. This configuration provides the capability to excavate and grade a swath of materials to the right side of the earth moving machine. Upon completion of the pass, the earth moving machine is turned around, and the beam pushing frame 11 is angled obtusely in a counterclockwise direction to the direction of push while the gang of disk units 45 is rotated clockwise by fully extending hydraulic cylinder 49. This converse configuration allows the disk excavating and grading attachment to continue excavating and grading a new swatch of materials to the left side of the machine. In this manner, a ridge of earth materials is constructed for applications such as road beds, terrace channel and ridge construction, ditching with a dike embankment for waterways, and many other earth moving construction techniques.

Although the invention has been illustrated and described herein with reference to specific embodiments thereof, it is understood that modifications and variations which do not change the spirit and scope of the invention are encompassed within the appended claims.

I claim:

1. A disk excavating and grading attachment for attaching to an earth moving machine or tractor, comprising a plurality of disk units mounted at closely spaced lateral positions to permit earth materials including snow to be excavated, pushed, and graded laterally when said earth moving machine or tractor is moved forward, wherein each disk unit includes a forwardly facing concave disk blade connected to a disk socket plate; each said disk mounting plate is connected by a longitudinal extension assembly to a disk unit mounting beam and wherein each of the longitudinal extension assemblies allows for independent longitudinal extension or retraction of their respective disk unit.

2. The device of claim 1, wherein said disk unit mounting beam is coupled to a beam pushing frame, said beam pushing frame includes a parallel offset shaft fixed to said beam pushing frame via a pair of support flanges mounted one on each side of said parallel offset shaft; said disk unit mounting beam is fixedly mounted to a sliding tube and which is slidingly engaged over said parallel offset shaft thereby providing means for mechanically shifting the load of said disk excavating and grading attachment in line with the push axis of said dozer or tractor C frame.

3. The device of claim 2, further comprising hydraulic power means for adjusting the position of said sliding tube relative to said beam pushing frame, using a hydraulic cylinder, connected via a pair of ball and socket joints, between a first mounting post fixed to one of said pair of said support flanges of said parallel offset shaft and a second mounting post fixed to said sliding tube.

4. The device of claim 2, comprising a pair of upper and lower flanges fixed to said disk unit mounting beam to limit the rotation of said sliding tube about an axis of said parallel offset shaft.

5. The device of claim 2, wherein said beam pushing frame is pivotally mounted to said dozer or tractor C frame for adjusting the angle of said beam pushing frame relative to a direction of push by a clevis assembly fixed to said beam pushing frame and coupled via a pin to said dozer or tractor C frame.

6. The device of claim 5, further comprising hydraulic power means including a pair of reciprocal operating hydraulic cylinders mounted one on each side of said dozer or tractor C frame in a mirror configuration for remotely adjusting said angle of said beam pushing frame relative to said direction of push, so as to grade said earth materials laterally to the one side or the other, respectively, of said dozer or tractor C frame, said cylinders at one end connected to a first ear flange fixed to said beam pushing frame and at the other end to a second ear flange attached to an upright post which is fixed to said dozer or tractor C frame.

7. The device of claim 1, wherein said longitudinal extension assembly comprises an hydraulic power means, including an hydraulic piston operating within an outer sleeve for remotely extending or retracting said concave disk blades and wherein said outer sleeve is restricted by a cylindrical stop attached to said outer sleeve which contacts said piston.

8. A disk excavating and grading attachment device for attaching to an earth working machine or tractor to permit earth materials including snow to be excavated, pushed, and graded laterally when said earth moving machine or tractor is moved forward, said attachment comprising: a plurality of disk units mounted at closely spaced lateral positions; each said disk unit includes a concave disk blade connected to a disk socket plate, each said disk socket plate being attached to a clevis beam having an upper flange plate and a lower flange plate separated by a pair of gusset plates; each said disk unit being rotatably connected to a disk unit mounting beam by one of said clevis beams via a coupling pin inserted through the middle of said upper flange plate, the disk unit mounting beam and the middle of said lower flange plate, whereby the angle of the disk units can be uniformly set by rotating the clevis beams about their respective coupling pin.

9. The device of claim 8, wherein said each clevis beam said is restricted in angular rotation by a pair of adjustable stops mounted to said disk unit mounting beam; one to each side of said clevis beam.

10. The device of claim 8, further comprising an hydraulic cylinder attached to one end to an ear flange plate connected to a sliding bar, said sliding bar being pivotally connected to said upper flange plate of each said clevis beam by a coupling pin inserted through said upper flange plate and said sliding bar, the other end of said hydraulic cylinder is attached to a second ear flange which is connected to a mounting post fixed to said disk unit mounting beam, whereby said sliding bar is transversely shifted relative to said disk unit mounting beam by the hydraulic cylinder to uniformly rotate and set the angle of said disk units.

* * * * *